United States Patent [19]
Mladenov et al.

[11] 3,820,547
[45] June 28, 1974

[54] VERTICAL CYLINDRICAL CORN HUSKING APPARATUS

[75] Inventors: Venko Dimitrov Mladenov; Ivan Vasilev Maslinkov, both of Sofia, Bulgaria

[73] Assignee: DSO Agromachina, Sofia, Bulgaria

[22] Filed: Apr. 2, 1973

[21] Appl. No.: 347,358

[30] Foreign Application Priority Data
Apr. 3, 1972   Bulgaria.............................. 20130

[52] U.S. Cl. .................................. 130/5 B
[51] Int. Cl. ................................... A01f 11/06
[58] Field of Search ................. 130/5 A, 5 B, 5 G

[56] References Cited
UNITED STATES PATENTS
| | | | |
|---|---|---|---|
| 1,407,057 | 2/1922 | Fuhlrodt | 130/5 B |
| 2,664,580 | 1/1954 | Feeser | 130/5 B |
| 2,845,932 | 8/1958 | Jones | 130/5 B |
| 3,425,422 | 2/1969 | Prosser | 130/5 B |

FOREIGN PATENTS OR APPLICATIONS
| | | | |
|---|---|---|---|
| 1,255,043 | 1/1961 | France | 130/5 B |

*Primary Examiner*—Antonio F. Guida
*Attorney, Agent, or Firm*—Arthur O. Klein

[57] ABSTRACT

Corn husking apparatus of the vertical type having husking roller pairs and baskets for the husked ears and the stem and leaf mass. Pairs of husking rollers are annularly disposed and are enclosed on the outer side by a casing for the leaf and stem mass. In the cylindrical space formed inside, between the rollers, on there is mounted a cylindrical pressing brush combined with a screw and fastened to the upper end of the axle there is a conical distributor with inclined blades. Ears to be husked are fed into a hopper fastened to the upper part of the frame of the apparatus, and in the lower part of the frame there is a bucket with an inclined bottom for the receiving husked ears.

3 Claims, 2 Drawing Figures

3,820,547

VERTICAL CYLINDRICAL CORN HUSKING APPARATUS

This invention relates to a vertical cylindrical apparatus for husking corn, which can be used in corn combines and for operation in stationary conditions.

Roller-type apparatuses for husking corn with inclined rollers are known, in which the pressing of the ear of corn against the rollers is effected by means of rubber pressing devices of the blade or other conveyor.

A particular feature of the operation of the presently used apparatuses for husking corn is that an exact and uniform distribution of the ears between the roller pairs is required in order to achieve a total husking. However, in the known roller-type apparatuses no efficient distribution of the ears is achieved, and as a result their productivity is low. In order to increase the productivity of the corn husking apparatus, a greater number of furbishing rollers are arranged in a horizontal row. This results in an increase of the width and weight of the apparatus, making impossible its use in corn combines. Moreover, the increase in width impairs the distribution of the cobs in the apparatus, which affects its productivity.

It is therefore a general object of the present invention to avoid all aforementioned drawbacks and to increase several fold the productivity of the apparatus for corn husking with regard to a corresponding increase of the productivity of the gathering machine too.

The vertical cylindrical apparatus for furbishing corn cobs operates according to a new technological principle, in which the ears are in continuous contact with the pairs of rotating rollers and are forcibly moved along them, performing helical motions. In this type of apparatus it is possible to install a considerably greater number of rotating roller pairs in comparatively small overall sizes of the apparatus as a result of their vertical and annular arrangement. Thus, its productivity is considerably increased, making it extremely suitable for operation in machines for gathering the corn ears and its simultaneous husking as well as for operation under stationary conditions as an independent machine.

According to the invention, the problem of the distribution of the ears is efficiently solved, regardless of their quantity, by means of a special conical distributing mechanism.

The vertical cylindrical apparatus for furbishing corn cobs, according to the present invention, provides a possibility of practically increasing the productivity of corn combines fitted with such apparatuses since up to the present their productivity was limited mainly by the low productivity of the corn husking apparatuses. As a result, corn combines fitted with such apparatuses can in fact be designed for gathering three, four, six or more rows. The design of the vertical cylindrical apparatus for corn husking permits operation at different slopes of the field, without any impairment of the quality of cob husking and without any change in its productivity.

For a better understanding of the invention, reference should be made to the accompanying drawings in which there is illustrated and described a preferred embodiment of the invention. In the drawings.

Figure 1:
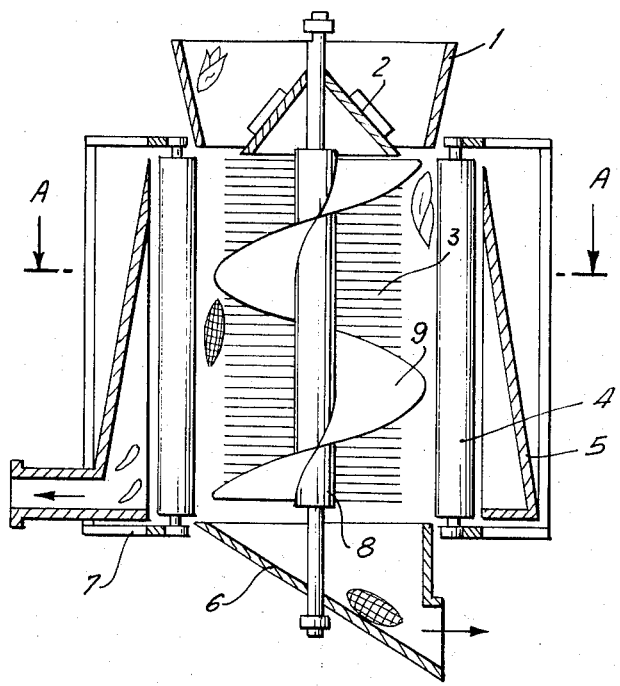
FIG. 1 is a view in vertical axial section through the apparatus.
Figure 2:
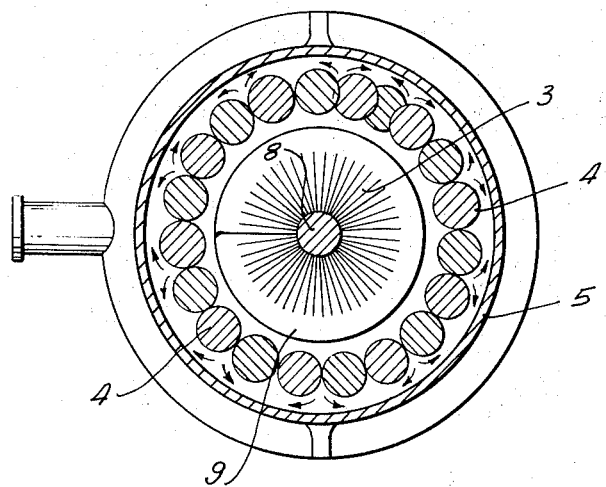
FIG. 2 is a horizontal cross-sectional view of the apparatus taken along the line A—A of FIG. 1.

In the illustrated apparatus according to the invention, the vertical cylindrical corn cob furbishing apparatus comprises a frame 7, on which there are attached annularly the furbishing rotating roller pairs 4, and mounted coaxially in the space between them there is a screw combined with a helical brush 3. Fastened to the upper end of the screw there is a frusto conical distributor 1 with inclined blades 2. Attached rigidly to the frame are receiving bucket 1, a bucket for the husked ears 6, and a casing for the enveloping blades 5.

The operation of the vertical cylindrical apparatus is as follows:

The corn ears in the receiving bucket 1 are directed by means of the conical distributor 2 in the space between the pairs of furbishing rollers 4 and the screw with the helical brush 3, where the helical brush presses the ears against the pairs of rollers rotating in opposite directions, which seize and tear off the enveloping leaves from the ears, while the screw forcibly pushes the ears downwards, displacing them vertically and at the same time helically along the inner surface of the cylinder formed by the pairs of rollers. During this displacement, the ears are continuously under the action of different roller pairs; as a result they are husked and fall into the bucket 6 for husked ears, from which they are delivered to the next transporation device (not shown). The enveloping leaves, and the stem and leaf mass, separated from the cobs, are collected in the casing 5, from where they can be gathered for forage or be thrown about in the field before ploughing.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a vertical cylindrical apparatus for husking corn, said apparatus having a frame, a receiving bucket, husking roller pairs and buckets for the husked ears and the stem and leaf mass, the improvement which comprises a husking pair of rollers annularly supported on the frame and enclosed on the outer side by a casing for the leaf and stem mass, within the cylindrical space formed inside the annularly disposed rollers there being an axle mounted coaxially of the annularly disposed rollers, and a cylindrical pressing brush and a screw fastened to the axle, and means for rotating the axle.

2. An apparatus as claimed in claim 1, comprising a receiving bucket mounted at the top of the apparatus, and a conical distributor with inclined blades disposed in the receiving bucket.

3. An apparatus as claimed in claim 1, comprising a discharge bucket in the lower part of the frame for receiving the husked ears, said discharge bucket having an inclined bottom.

* * * * *